(12) United States Patent
Kim et al.

(10) Patent No.: US 11,271,604 B2
(45) Date of Patent: Mar. 8, 2022

(54) COVER ACCESSORY AND ELECTRONIC DEVICE INCLUDING THE SAME

(71) Applicant: Samsung Electronics Co., Ltd., Gyeonggi-do (KR)

(72) Inventors: Han Kim, Gyeonggi-do (KR); Minah Koh, Gyeonggi-do (KR); Hyoungshin Park, Gyeonggi-do (KR); Jiseung Song, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/688,494

(22) Filed: Nov. 19, 2019

(65) Prior Publication Data

US 2020/0264661 A1 Aug. 20, 2020

(30) Foreign Application Priority Data

Feb. 20, 2019 (KR) .......................... 10-2019-0019912

(51) Int. Cl.
*H04B 1/3888* (2015.01)
*H04B 5/00* (2006.01)
(Continued)

(52) U.S. Cl.
CPC ......... *H04B 1/3888* (2013.01); *G06F 1/1628* (2013.01); *G06F 1/1632* (2013.01);
(Continued)

(58) Field of Classification Search
CPC .................. G06F 1/16–166; H04B 1/3888
See application file for complete search history.

(56) References Cited

U.S. PATENT DOCUMENTS 6,773,644 B1 * 8/2004 Eiden ................ B29C 45/14811
264/132
6,944,482 B2 * 9/2005 Engstrom ............... H04M 1/22
455/566
(Continued)

FOREIGN PATENT DOCUMENTS

KR     10-1423929     7/2014
KR     10-1466986 B1     11/2014
(Continued)

OTHER PUBLICATIONS

International Search Report dated Feb. 24, 2020 issued in counterpart application No. PCT/KR2019/015507, 3 pages.

*Primary Examiner* — Gennadiy Tsvey
(74) *Attorney, Agent, or Firm* — The Farrell Law Firm, P.C.

(57) ABSTRACT

A cover accessory capable of operating a light emitting device without a separate power source and an electronic device including the cover accessory are provided. A cover accessory includes a cover that is detachably combinable with an electronic device and formed to surround a rear plate and a lateral member of the electronic device. The cover includes a recess formed to correspond to the rear plate of the electronic device. The cover accessory includes a circuit board disposed in the recess such that a surface thereof faces the recess, a light source layer including a plurality of light emitting devices disposed on the surface of the circuit board, a wireless power receiving module disposed on one of the surface or an opposite surface of the circuit board, and a cover processor disposed on one of the surface or the opposite surface of the circuit board and electrically connected to the wireless power receiving module and the plurality of light emitting devices of the light source layer.

7 Claims, 8 Drawing Sheets

(51) Int. Cl.
*G06F 1/16* (2006.01)
*H04M 1/02* (2006.01)

(52) U.S. Cl.
CPC ......... *H04B 5/0031* (2013.01); *H04B 5/0037* (2013.01); *G06F 1/1626* (2013.01); *H04M 1/0254* (2013.01)

(56) References Cited

U.S. PATENT DOCUMENTS

| | | | | |
|---|---|---|---|---|
| 7,336,980 | B1* | 2/2008 | Kaikuranta | H04M 1/0283 455/575.6 |
| 8,428,644 | B1* | 4/2013 | Harooni | H04B 1/3888 455/550.1 |
| 9,337,883 | B1* | 5/2016 | Wang | H04R 7/045 |
| 10,084,501 | B1* | 9/2018 | Coverstone | H04M 19/048 |
| 10,134,309 | B2* | 11/2018 | Nakamura | G09F 13/20 |
| 10,276,326 | B1* | 4/2019 | Wang | H02J 50/10 |
| 10,298,059 | B2* | 5/2019 | Yio | H02J 7/0042 |
| 10,334,098 | B1* | 6/2019 | Coverstone | H04M 1/576 |
| 2006/0052063 | A1* | 3/2006 | Lohr | H04M 1/0283 455/90.3 |
| 2009/0231248 | A1* | 9/2009 | Dorff | H04M 1/0283 345/83 |
| 2010/0078343 | A1* | 4/2010 | Hoellwarth | G06F 3/041 206/320 |
| 2010/0331054 | A1* | 12/2010 | Roberts | H04M 1/57 455/567 |
| 2011/0175747 | A1* | 7/2011 | Small | H04M 1/0283 340/815.45 |
| 2011/0195753 | A1* | 8/2011 | Mock | H04B 1/3888 455/566 |
| 2012/0052929 | A1* | 3/2012 | Thammasouk | H04M 1/0283 455/575.1 |
| 2012/0244848 | A1* | 9/2012 | Ghaffari | H04M 1/72412 455/415 |
| 2012/0302294 | A1* | 11/2012 | Hammond | H04M 1/18 455/567 |
| 2013/0273944 | A1* | 10/2013 | Wilson | H05K 5/0247 455/457 |
| 2013/0298039 | A1* | 11/2013 | Mestre | G06F 1/1626 715/753 |
| 2013/0328774 | A1* | 12/2013 | Chen | G06F 3/03547 345/158 |
| 2014/0015756 | A1* | 1/2014 | Yang | G06F 1/1643 345/168 |
| 2014/0179375 | A1* | 6/2014 | Yang | H04B 1/3888 455/566 |
| 2014/0179376 | A1* | 6/2014 | Yang | H04M 1/57 455/566 |
| 2014/0274215 | A1* | 9/2014 | Del Toro | G06F 1/1628 455/566 |
| 2014/0376192 | A1 | 12/2014 | Park et al. | |
| 2015/0005034 | A1* | 1/2015 | Agnes Desodt | A45C 11/00 455/566 |
| 2015/0311939 | A1* | 10/2015 | Zalon | H04B 1/3888 455/575.6 |
| 2015/0312884 | A1* | 10/2015 | Kharitonov | H04W 4/14 455/412.2 |
| 2016/0004000 | A1* | 1/2016 | Huang | G02B 6/0061 362/608 |
| 2016/0369976 | A1* | 12/2016 | Lee | F21V 5/002 |
| 2017/0031398 | A1* | 2/2017 | Myers | G06F 1/182 |
| 2017/0047764 | A1 | 2/2017 | Lee et al. | |
| 2017/0049000 | A1* | 2/2017 | Kang | A45C 13/002 |
| 2017/0123458 | A1* | 5/2017 | Perry | G06F 1/1628 |
| 2017/0170859 | A1* | 6/2017 | Noori | H04B 7/0617 |
| 2017/0205854 | A1* | 7/2017 | Zenoff | G06F 1/1639 |
| 2018/0019779 | A1* | 1/2018 | Chou | C25D 11/026 |
| 2018/0034496 | A1* | 2/2018 | Jacobsen | G06F 1/1656 |
| 2018/0040780 | A1 | 2/2018 | Hirasawa et al. | |
| 2018/0161594 | A1 | 6/2018 | Yehezkel | |
| 2018/0210345 | A1 | 7/2018 | Wolterink et al. | |
| 2018/0359343 | A1* | 12/2018 | Lee | G02F 1/167 |
| 2019/0341958 | A1* | 11/2019 | Coverstone | H04M 19/04 |
| 2020/0059259 | A1* | 2/2020 | Quill | H04M 1/7246 |

FOREIGN PATENT DOCUMENTS

| | | |
|---|---|---|
| KR | 1020150000041 | 1/2015 |
| KR | 1020160145354 | 12/2016 |

* cited by examiner

COVER ACCESSORY AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2019-0019912, filed on Feb. 20, 2019, in the Korean Intellectual Property Office, the entire disclosure of which is incorporated herein by reference.

BACKGROUND

1. Field

The disclosure relates generally to a cover accessory capable of operating a light emitting device without a separate power source and to an electronic device including the cover accessory.

2. Description of Related Art

Electronic devices such as smart phones have developed over time to be thinner, lighter, and higher performing, and to provide various functions that improve portability and usability. In addition, recent electronic devices have beautiful exterior designs that appeal to consumers.

A cover accessory that can be attached to an electronic device is often used to enhance the durability of the electronic device and customize an appearance of the electronic device. Accordingly, various studies are being made on how to improve the beauty and robustness of a cover accessory itself.

SUMMARY

In accordance with an aspect of the disclosure, a cover accessory is provided, which includes a cover detachably combined with an electronic device, formed to surround a rear plate and a lateral member of the electronic device, and including a recess formed to correspond to the rear plate of the electronic device. The cover accessory may further include a circuit board disposed in the recess such that one surface thereof faces the recess, a light source layer including a plurality of light emitting devices disposed on the one surface of the circuit board, a wireless power receiving module disposed on one of the one surface or an opposite surface of the circuit board, and a cover processor disposed on one of the one surface or the opposite surface of the circuit board and electrically connected to both the wireless power receiving module and the plurality of light emitting devices of the light source layer.

In accordance with another aspect of the disclosure, an electronic device is provided, which includes a housing including a front plate, a rear plate, and a lateral member surrounding a space between the front plate and the rear plate, the housing being detachably combined with a cover accessory. The electronic device may further include a display viewed through at least a portion of the front plate, and a processor configured to detect a wireless power receiving module of the cover accessory and thereby recognize that the cover accessory is combined.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments. Therefore, it should be apparent to those, skilled in the art that various changes and modifications of the embodiments described herein can be made without departing from the scope and spirit of the disclosure. In addition, descriptions of well-known functions and constructions are omitted for clarity and conciseness.

Figure 1:
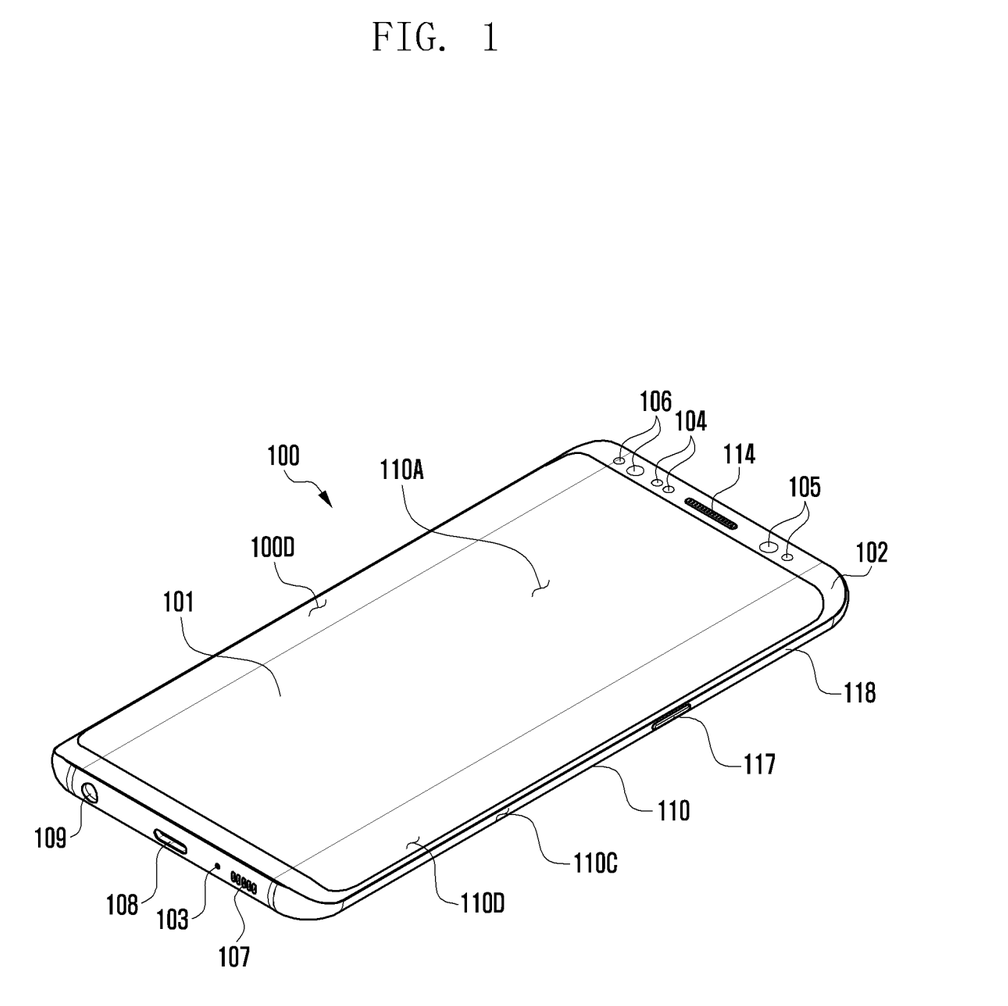
FIG. 1 illustrates a front surface of an electronic device according to an embodiment.
Figure 2:
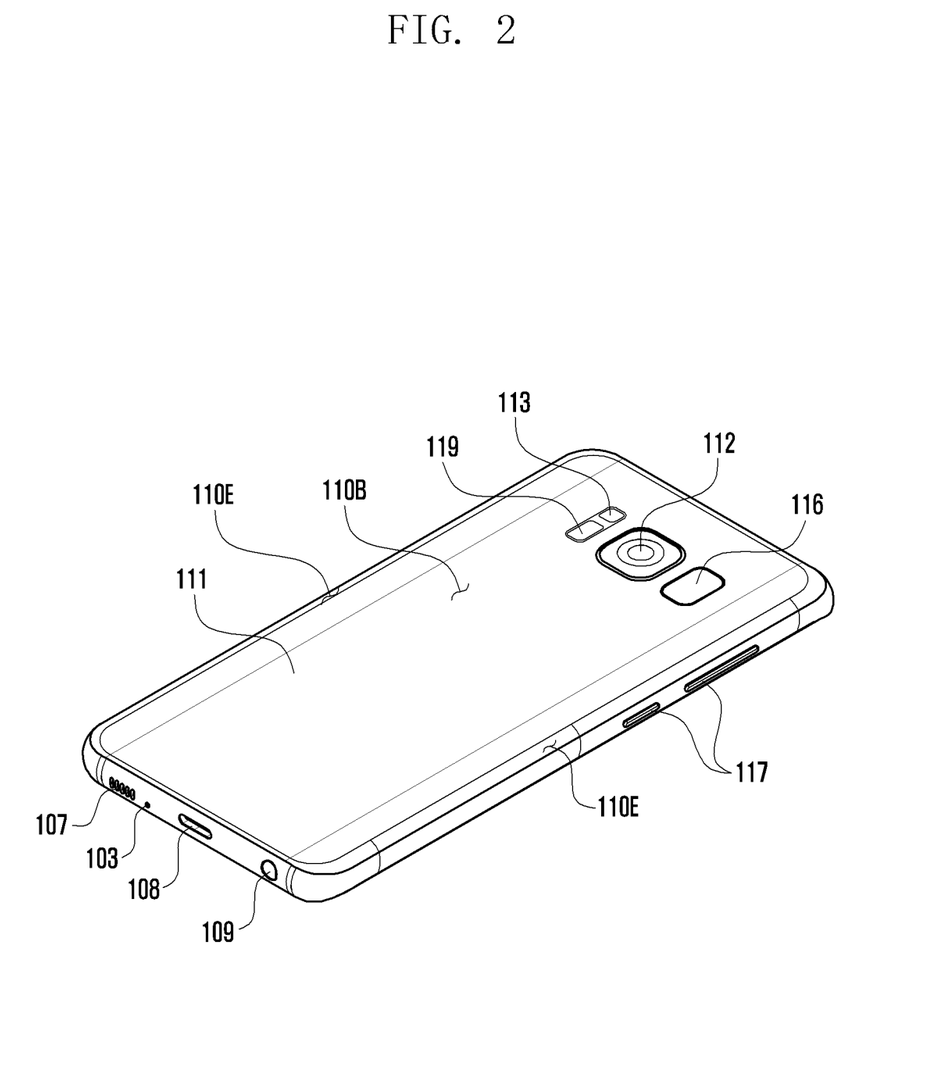
FIG. 2 illustrates a rear surface of the electronic device illustrated in FIG. 1 according to an embodiment.

FIG. 1 illustrates a front surface of an electronic device according to an embodiment. FIG. 2 illustrates a rear surface of the electronic device illustrated in FIG. 1 according to an embodiment.

Referring to FIGS. 1 and 2, an electronic device 100 includes a housing 110 including a first surface (or front surface) 110A, a second surface (or rear surface) 110B, and a side surface 110C surrounding the space between the first surface 110A and the second surface 110B. Alternatively, the housing may denote a structure that forms a part of the first surface 110A, the second surface 110B, and the side surface 110C illustrated in FIG. 1.

The first surface 110A may be formed by a front plate 102, at least a part of which is substantially transparent (e.g., a glass plate including various coating layers, or a polymer plate). The second surface 110B may be formed by a rear plate 111 that is substantially opaque. The rear plate 111 may be made of coated or colored glass, ceramic, polymer, metal (e.g., aluminum, stainless steel (STS), or magnesium), or a combination of at least two of the above-mentioned materials. The side surface 110C may be formed by a side bezel structure (or side member) 118 which is coupled to the front plate 102 and to the rear plate 111, and which includes metal and/or polymer. The rear plate 111 and the side bezel structure 118 may be formed integrally and may include the same material (e.g., a metal material such as aluminum).

The front plate 102 includes two first areas 100D, 110D on respective ends of the long edge of the front plate 102 such that the two first areas 100D, 110D bend from the first surface 110A toward the rear plate 111 and extend seamlessly.

As illustrated in FIG. 2, the rear plate 111 includes two second areas 110E on both ends of the long edge such that the two second areas 110E bend from the second surface 110B toward the front plate 102 and extend seamlessly.

Alternatively, the front plate 102 (or the rear plate 111) may include only one of the first areas 110D (or the second areas 110E), or a part of the first areas 110D or the second areas 110E may be omitted.

When viewed from the side surface of the electronic device 100, the side bezel structure 118 may have a first thickness (or width) on a part of the side surface, which does not include the first areas 110D or the second areas 110E, and may have a second thickness that is smaller than the first thickness on a part of the side surface, which includes the first areas 110D or the second areas 110E.

The electronic device 100 includes a display 101, audio modules 103, 107, and 114, sensor modules 104, 116, and 119, camera modules 105, 112, and 113, a key input device 117, a light-emitting element 106, and connector holes 108 and 109. Alternatively, at least one of the constituent elements (e.g., the key input device 117 or the light-emitting element 106) of the electronic device 100 may be omitted, or the electronic device 100 may include additional elements.

The display 101 may be exposed through a corresponding part of the front plate 102. At least a part of the display 101 may be exposed through the front plate 102 that forms the first areas 110D of the side surface 110C and the first surface 110A.

The display 101 may have a corner formed in substantially the same shape as that of the adjacent outer periphery of the front plate 102. Alternatively, in order to increase the area of exposure of the display 101, the interval between the outer periphery of the display 101 and the outer periphery of the front plate 102 may be formed to be substantially identical.

A recess or an opening may be formed in a part of the screen display area of the display 101, and at least one of an audio module 114, a sensor module 104, a camera module 105, and a light-emitting element 106 may be included and aligned with the recess or the opening Alternatively, at least one of an audio module 114, a sensor module 104, a camera module 105, a fingerprint sensor 116, and a light-emitting element 106 may be included on the back surface of the screen display area of the display 101.

The display 101 may be coupled to or arranged adjacent to a touch sensing circuit, a pressure sensor capable of measuring the intensity (pressure) of a touch, and/or a digitizer that detects a magnetic field-type stylus pen.

At least a part of the sensor modules 104 and 119 and/or at least a part of the key input device 117 may be arranged in the first areas 110D and/or the second areas 110E.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed.

The speaker holes 107 and 114 may include an outer speaker hole 107 and a speech receiver hole 114. The speaker holes 107 and 114 and the microphone hole 103 may be implemented as a single hole, or a speaker may be included (e.g., a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include a first sensor module 104 (e.g., a proximity sensor) arranged on the first surface 110A of the housing 110, and/or a second sensor module (e.g., a fingerprint sensor), and/or a third sensor module 119 (e.g., a heart rate monitor (HRM) sensor) arranged on the second surface 110B of the housing 110, and/or a fourth sensor module 116 (e.g., a fingerprint sensor). The fingerprint sensor may be arranged on the first surface 110A (e.g., the display 101) of the housing 110, and/or on the second surface 110B thereof. The electronic device 100 may also include other sensor modules, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, a luminance sensor, etc.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include a light-emitting diode or a xenon lamp. Two or more lenses (an infrared camera, a wide-angle lens, and a telephoto lens) and image sensors may be arranged on a single surface of the electronic device 100.

The key input device 117 may be arranged on the side surface 110C of the housing 110. Alternatively, the electronic device 100 may omit a part of the above-mentioned key input device 117 or the entire key input device 117, and the key input device 117 may be implemented in another type, such as a soft key, on the display 101. The key input device may include a sensor module 116 arranged on the second surface 110B of the housing 110.

The light-emitting element 106 may be arranged on the first surface 110A of the housing 110. The light-emitting element 106 may provide information regarding the condition of the electronic device 100 in a light type. The light-emitting element 106 may provide a light source that interworks with operation of the camera module 105, for example. The light-emitting element 106 may include a light emitting diode (LED), an IR LED, and a xenon lamp.

The connector holes 108 and 109 may include a first connector hole 108 capable of containing a connector (e.g., a universal serial bus (USB) connector) for transmitting/receiving power and/or data to/from an external electronic device, and/or a second connector hole (e.g., an earphone jack) 109 capable of receiving a connector for transmitting/receiving an audio signal to/from the external electronic device.

Figure 3:
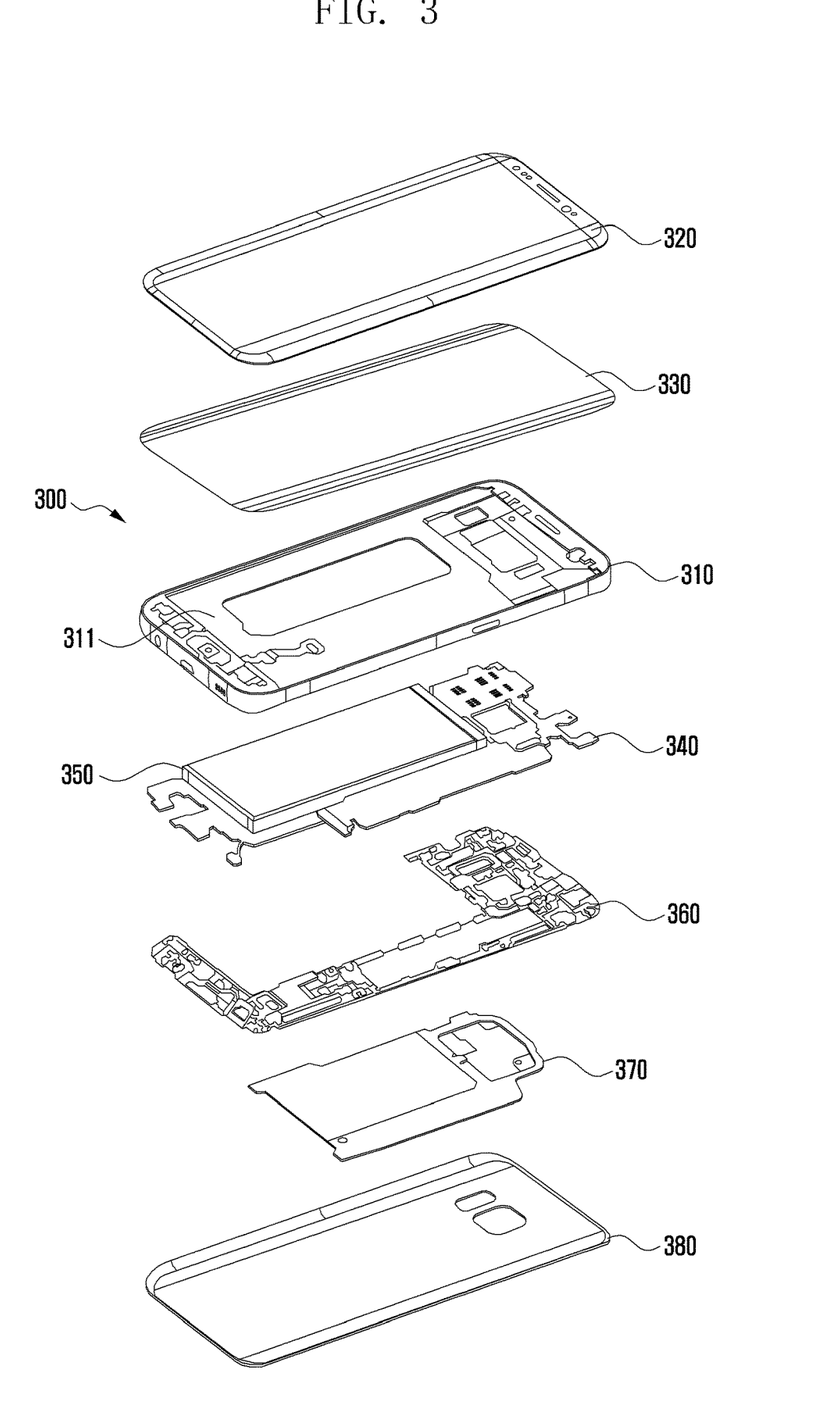
FIG. 3 illustrates an exploded perspective view of an electronic device according to an embodiment.

FIG. 3 illustrates an exploded perspective view of the electronic device according to an embodiment.

Referring to FIG. 3, an electronic device 300 includes a side bezel structure 310, a first support member 311 (e.g., a bracket), a front plate 320, a display 330, a printed circuit board 340, a battery 350, a second support member 360 (e.g., a rear case), an antenna 370, and a rear plate 380. Alternatively, at least one of the constituent elements (such as the first support member 311 or the second support member 360) of the electronic device 300 may be omitted, or the electronic device 300 may include another constituent element. At least one of the constituent elements of the electronic device 300 may be identical or similar to at least one of the constituent elements of the electronic device 100 of FIGS. 1 and 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (e.g., a polymer) material. The display 330 may be coupled to one surface of the first support member 311, and the printed circuit board 340 may be coupled to the other surface thereof. A processor, a memory, and/or an interface may be mounted on the printed circuit board 340. The processor may include one or more of a central processing device (CPU), an application processor (AP), a graphic processing device (GPU), an image signal processor (ISP), a sensor hub processor, or a communication processor (CP).

The memory may include a volatile memory or a non-volatile memory.

The interface may include a high definition multimedia interface (HDMI), a USB interface, a secure digital (SD) card interface, and/or an audio interface. The interface may connect the electronic device 300 with an external electronic device electrically or physically, and may include a USB connector, an SD card/multimedia card (MMC) connector, or an audio connector.

The battery 350 supplies power to at least one constituent element of the electronic device 300, and may include a non-rechargeable primary cell, a rechargeable secondary cell, or a fuel cell. At least a part of the battery 350 may be arranged on substantially the same plane with the printed circuit board 340. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include a near field communication (NFC) antenna, a wireless charging antenna, and/or a magnetic secure transmission (MST) antenna. The antenna 370 may conduct near-field communication with an external device or may wirelessly transmit/receive power necessary for charging. An antenna structure may be formed by a part or a combination of the side bezel structure 310 and/or the first support member 311.

Figure 4:
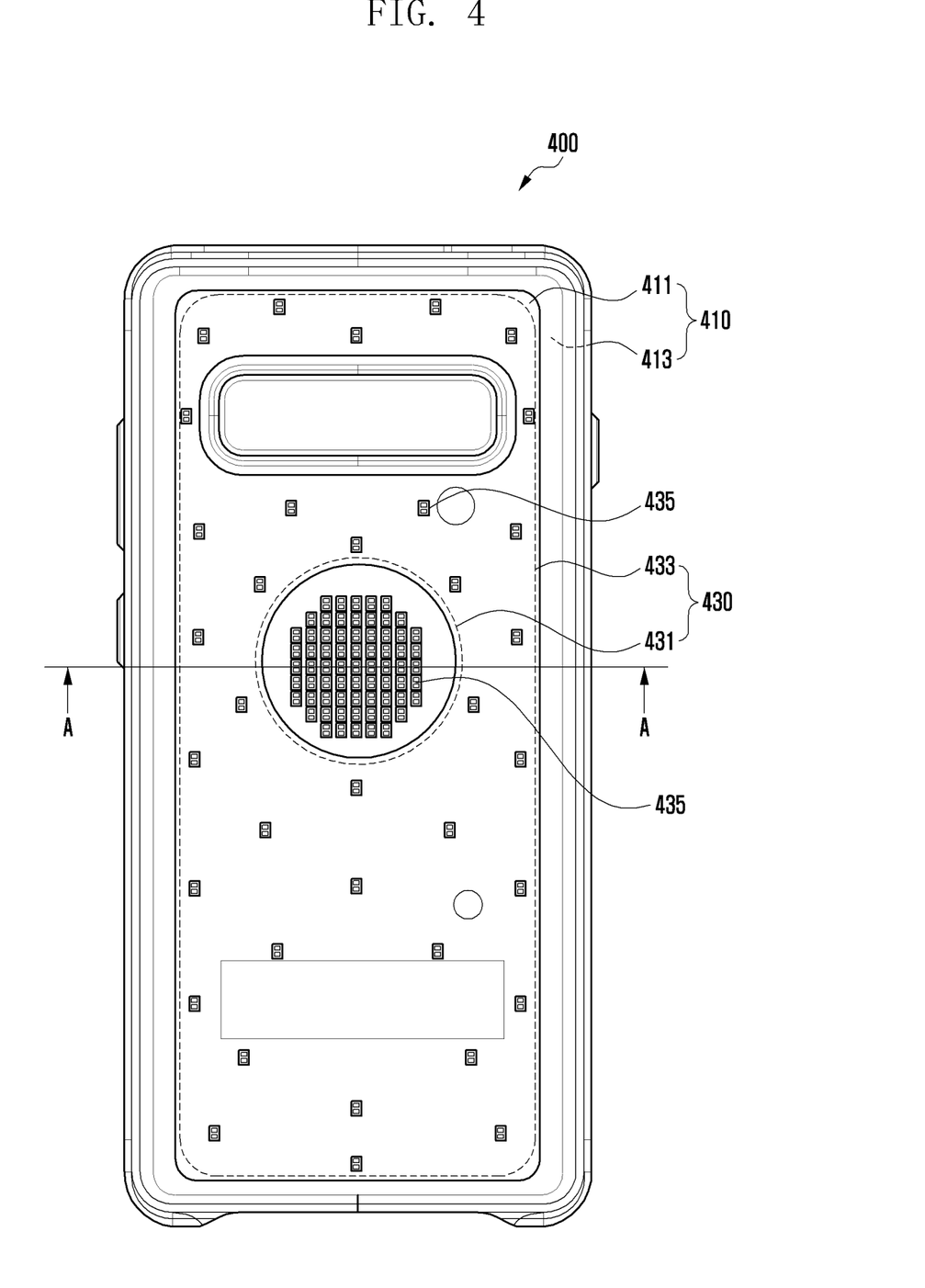
FIG. 4 illustrates a cover accessory according to an embodiment.

FIG. 4 illustrates a cover accessory according to an embodiment. In particular, FIG. 4 illustrates a surface 411 of a cover 410 of a cover accessory 400 when a finishing layer 460 is removed in order to expose a light source layer 430.

Figure 5:
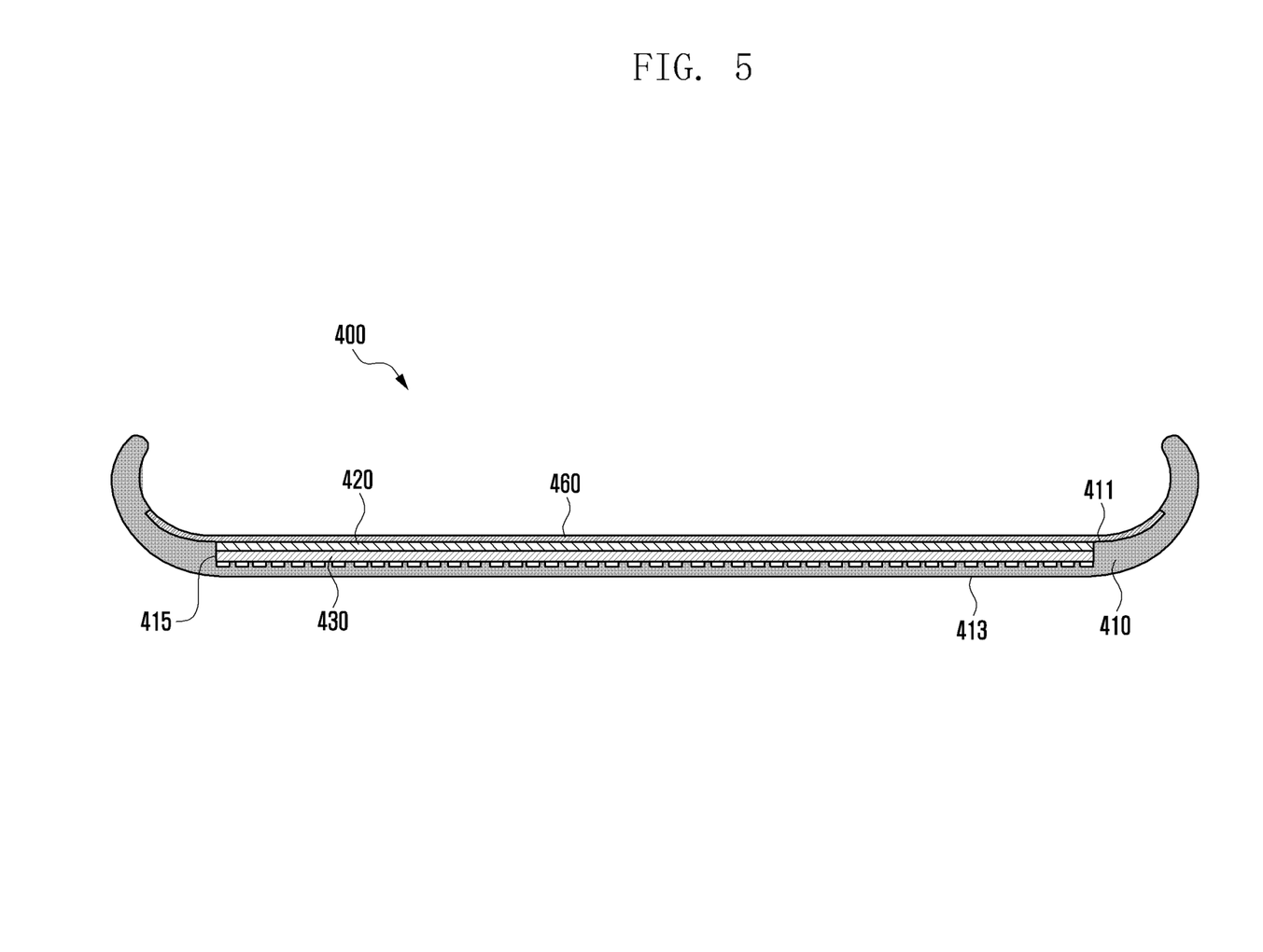
FIG. 5 illustrates a cross-sectional view taken along a line A-A of FIG. 4 according to an embodiment.

FIG. 5 illustrates a cross-sectional view taken along a line A-A of FIG. 4 according to an embodiment.

Figure 6:
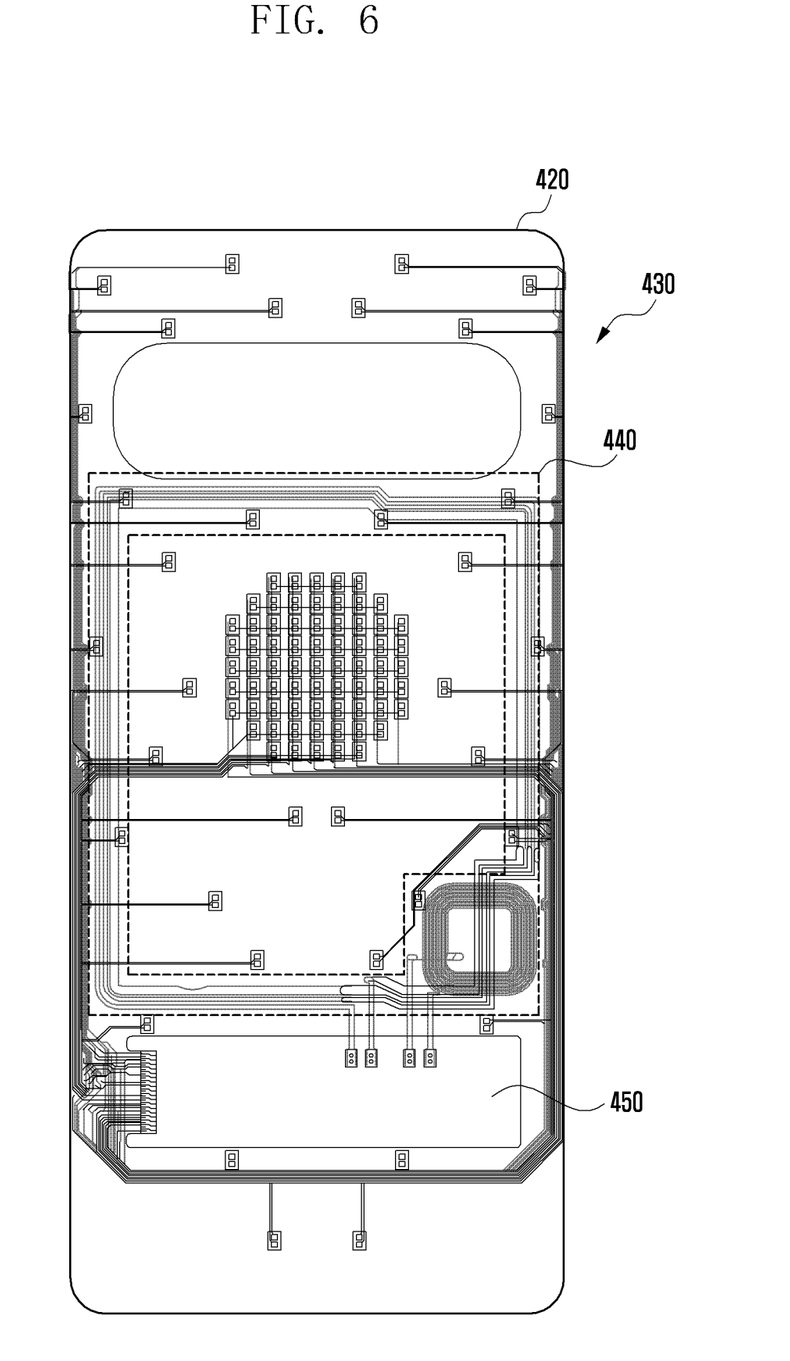
FIG. 6 illustrates a light source layer and a wireless power receiving module disposed in a cover accessory according to an embodiment.

FIG. 6 illustrates a light source layer and a wireless power receiving module disposed in a cover accessory according to an embodiment.

Referring to FIG. 4, the cover accessory 400 includes the cover 410, a circuit board 420 (FIG. 5), the light source layer 430, and a wireless power receiving module 440 (FIG. 6).

The cover 410 may be formed to surround a rear plate and a lateral member of the electronic device. That is, the cover 410 may be formed to surround the electronic device, except for a front plate to which a display of the electronic device is exposed. The surface 411 of the cover 410 may face the rear plate of the electronic device, and the opposite surface 413 of the cover 410 may be exposed to the outside of the electronic device. That is, the opposite surface 413 of the cover 410 can be seen to a user. The cover 410 may include a recess 415 (FIG. 5) formed in the surface 411 toward the opposite surface 413. The size of the recess 415 may substantially correspond to the size of the rear plate of the electronic device. In the recess 415, components such as the circuit board 420, the light source layer 430, and the wireless power receiving module 440 may be disposed.

The cover 410 may be formed of a plastic polymer such as resin or polycarbonate (PC) through an injection molding process. In this process, a dye may be mixed with the plastic polymer. The dye may be used to shield components such as the circuit board 420, the light source layer 430, or the wireless power receiving module 440 from being viewed through the opposite surface 413 of the cover 410. On the opposite surface 413 of the cover 410, a metal oxide may be deposited through a surface treatment process. Through this process, the texture, color, etc., of the opposite surface 413 of the cover 410 may be adjusted, and components such as the circuit board 420, the light source layer 430, or the wireless power receiving module 440 may be shielded from being viewed through the opposite surface 413 of the cover 410. A metal deposited to form the metal oxide may be aluminum or nickel. The degree of shielding using the dye and/or the metal oxide is sufficient if internal components are not visible when viewed from the opposite surface 413 of the cover 410. However, when the light emitting device 435 is turned on at the one surface 411 of the cover 410, the light should penetrate through and be viewed at the opposite surface 413.

The circuit board 420 may be disposed such that one surface thereof faces the recess 415 of the cover 410. The light source layer 430 is formed of a plurality of light emitting devices 435 and may be disposed on the one surface of the circuit board 420. The circuit board 420 may be a flexible printed circuit board (FPCB) and may be formed to about 1.0 T including the thickness of the light emitting device 435.

The light source layer 430 may be disposed on the one surface of the circuit board 420 to emit light toward the opposite surface 413 of the cover 410. The plurality of light emitting devices 435 may be disposed on the light source layer 430. The light emitting device 435 may be an LED device. The light source layer 430 includes a light emitting device concentrated area 431 and a light emitting device dispersed area 433. The light emitting device concentrated area 431 refers to an area that corresponds to a central position of the recess 415 and has the light emitting devices 435 arranged densely. The light emitting device dispersed area 433 refers to an area that is other than the light emitting device concentrated area 431 and has the light emitting devices 435 arranged sparsely. In the light emitting device concentrated area 431, the light emitting devices 435 may be regularly arranged and selectively turned on or off to form various patterns, such as icons illustrated in FIGS. 7 and 8. In the light emitting device dispersed area 433, the light emitting devices 435 may be arranged regularly or irregularly and adjusted in brightness to act as a mood light.

Figure 7:
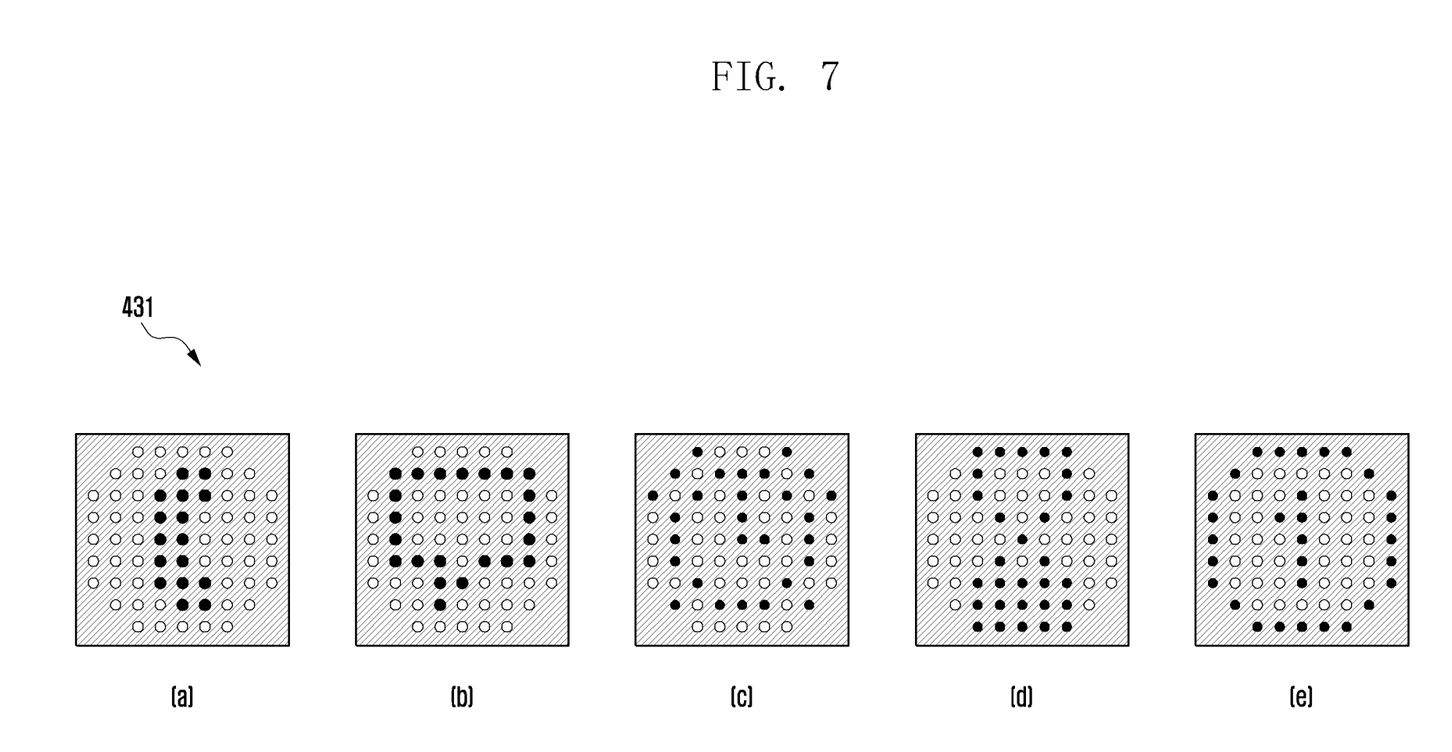
FIGS. 7 and 8 illustrate various patterns displayed in a light emitting device concentrated area according to an embodiment.
Figure 8:
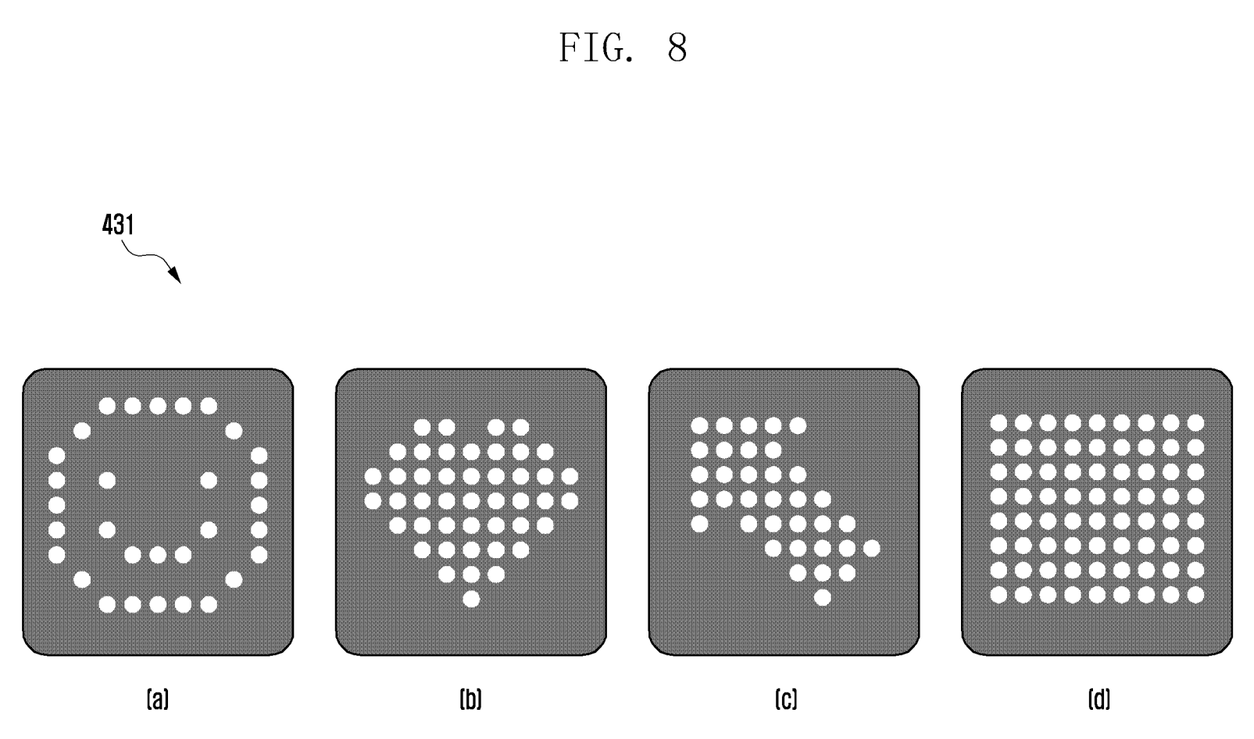

When a first predetermined event occurs, a processor of the electronic device may generate a first signal and a processor 450 of the cover accessory (hereinafter referred to as "a cover processor 450", as illustrated in FIG. 6) recognize the first signal. Upon receiving the first signal, the cover processor 450 may control the light emitting devices in the light emitting device concentrated area 431 to represent various icons, e.g., as illustrated in FIGS. 7 and 8.

The first event may be an execution of a camera application of the electronic device, or reception of a call, a text message, etc., while the electronic device is upside down, i.e., when the display of the electronic device faces down.

When a second predetermined event occurs, the processor of the electronic device may generate a second signal, which is received by the cover processor 450.

Upon receiving the second signal, the cover processor 450 may control the light emitting device in the light emitting device dispersed area 433 to produce a certain atmosphere, such as a mood light. The second event may indicate a situation where the display of the electronic device faces down and is in an idle state.

In response to any predetermined situation (i.e., a third event), the cover processor may control the light emitting devices in the light emitting device concentrated area 431 and/or the light emitting device dispersed area 433.

Referring to FIG. 5, the cover accessory 400 includes the cover 410, the circuit board 420, the light source layer 430, and the finishing layer 460.

The surface 411 of the cover 410 may be a surface facing the rear plate of the electronic device, and the opposite surface 413 of the cover 410 may be a surface exposed to the outside of the electronic device to be seen to a user.

The recess 415 may be formed in the one surface 411 of the cover 410 toward the opposite surface 413. The size of the recess 415 may substantially correspond to the size of the rear plate of the electronic device. In the recess 415, components such as the circuit board 420, the light source layer 430, and the wireless power receiving module 440 may be disposed.

The circuit board 420 may be disposed such that one surface thereof faces the recess 415 of the cover 410. The light source layer 430 is formed of the plurality of light emitting devices 435 and may be disposed on the one surface of the circuit board 420. The light emitting device 435 may be an LED device. The circuit board 420 may be provided in the form of a module together with the light emitting devices 435 and formed to about 1.0 T including the thickness of the light emitting device 435.

The cover 410 may have different thicknesses depending on whether the light emitting devices 435 are located. That is, the surface 411 of the cover 410 may be formed thin at portions corresponding to positions of the light emitting devices 435. For example, when the total thickness of the cover 410 is about 1 T, a portion corresponding to the position of the light emitting device 435 may be formed with about 0.8 T.

The finishing layer 460 may cover the recess 415 on the one surface 411 of the cover 410 such that various components disposed in the recess 415 are not visible. In addition, the finishing layer 460 may be formed of a soft material so as not to damage the rear plate 111 of the electronic device when the cover accessory 400 is combined with the electronic device. For example, the finishing layer 460 may be formed of a leather material.

Referring to FIG. 6, the light source layer 430 may be formed of the plurality of light emitting devices 435 disposed on one surface of the circuit board 420. The light emitting devices 435 may be LED devices, and the circuit board 420 may be provided in the form of a module together with the LED devices 435.

The wireless power receiving module 440 may be an NFC module. When combined with the electronic device, the cover accessory 400 may receive power from the electronic device through the NFC module 440 and thereby drive the light source layer 430. The NFC module 440 may include an NFC coil, which may be disposed as close to edges of the circuit board 420 as possible. In the example of FIG. 6, the NFC coil is disposed as close to left and right edges of the circuit board 420 as possible and is disposed outward in a length direction as far as possible without interfering with both the camera hole and the cover processor 450 provided in/on the circuit board 420.

The cover processor 450 may be electrically connected to the light emitting devices 435 of the light source layer 430 and to the wireless power receiving module 440. The cover processor 450 may be driven by power supplied through the wireless power receiving module 440 and thereby control the light emitting devices 435 to be selectively turned on or off. The cover processor 450 may be mounted on or embedded in the circuit board 420. Alternatively, the cover processor 450 may be separately formed and electrically connected to the circuit board 420.

FIGS. 7 and 8 illustrate various patterns displayed in a light emitting device concentrated area according to an embodiment.

Specifically, FIG. 7 illustrates exemplary patterns displayed in the light emitting device concentrated area 431 when the cover accessory 400 combined with the electronic device is placed so that the opposite surface 413 of the cover is visible, i.e., when the display 101 of the electronic device faces down. Therefore, even when the electronic device is upside down, the electronic device is capable of visually offering various notifications (or events), produced therein, to a user by displaying such patterns in the form of icons in the light emitting device concentrated area of the cover accessory. To display such patterns, the cover processor 450 may control each of the light emitting devices 435 to be selectively turned on or off.

The exemplary patterns illustrated in FIG. 7 present icons that represent a received call notification (a), a message notification (b), an alarm notification (c), a timer notification (d), and a schedule notification (e).

FIG. 8 illustrates exemplary patterns displayed in the light emitting device concentrated area 431 when the electronic device combined with the cover accessory 400 performs a camera function. For example, such a pattern may indicate a smile icon (a) to be seen to a photographed target. Additionally, a pattern may indicate a suitable icon for interesting an infant. Patterns may indicate various icons, such as a heart (b), an arrow (c), and a rectangle (d) for expressing various messages.

According to an embodiment, a cover accessory includes a cover that is detachably combined with an electronic device, is formed to surround a rear plate and a lateral member of the electronic device, and includes a recess formed to correspond to the rear plate of the electronic device. The cover accessory also includes a circuit board disposed in the recess such that one surface thereof faces the recess, a light source layer including a plurality of light emitting devices disposed on the one surface of the circuit board, a wireless power receiving module disposed on one of the one surface or an opposite surface of the circuit board, and a cover processor disposed on one of the one surface or the opposite surface of the circuit board and electrically connected to both the wireless power receiving module and the plurality of light emitting devices of the light source layer.

The wireless power receiving module may be an NFC module.

The light source layer may include a light emitting device concentrated area formed to correspond to a central position of the recess, and a light emitting device dispersed area other than the light emitting device concentrated area.

The cover processor may control the light source layer to represent a predetermined pattern in the light emitting device concentrated area when receiving a first signal from the electronic device.

The cover processor may control the light source layer to produce a specific atmosphere in the light emitting device dispersed area when receiving a second signal from the electronic device.

The cover may have a surface formed to be uneven and an opposite surface formed to be flat, the surface of the cover being depressed at portions corresponding to the positions of the light emitting devices.

The cover may include a deposition layer formed of a metal oxide deposited on a surface thereof.

The circuit board may be an FPCB, and the light emitting device may be an LED device.

The cover may be formed of a plastic polymer and a shielding dye mixed together.

The cover accessory may further include a finishing layer disposed on one surface of the cover and covering the recess.

According to an embodiment, an electronic device includes a housing including a front plate, a rear plate, and a lateral member surrounding a space between the front plate and the rear plate, the housing being detachably combined with a cover accessory. The electronic device further includes a display viewed through at least a portion of the front plate, and a processor configured to detect a wireless power receiving module of the cover accessory and thereby recognize that the cover accessory is combined.

The processor may be configured to generate a first signal in response to occurrence of a first predetermined event and deliver the first signal to the cover accessory such that the cover accessory represents a predetermined pattern in a light emitting device concentrated area thereof.

The processor may be configured to generate a second signal in response to occurrence of a second predetermined event and deliver the second signal to the cover accessory such that the cover accessory produces a specific atmosphere in a light emitting device dispersed area thereof.

The processor may be configured to generate a third signal in response to occurrence of a third predetermined event and deliver the third signal to the cover accessory such that the cover accessory visually offers a specific shape in both a light emitting device concentrated area and a light emitting device dispersed area thereof.

The wireless power receiving module of the cover accessory may be an NFC module.

While the disclosure has been particularly shown and described with reference to certain embodiments thereof, it will be understood by those skilled in the art that various changes in form and details may be made therein without departing from the scope of the disclosure as defined by the appended claims.

What is claimed is:

1. A cover accessory, comprising:
a cover that is detachably combinable with an electronic device and formed to surround a rear plate and a lateral member of the electronic device, the cover including a recess formed to correspond to the rear plate of the electronic device;
a circuit board disposed in the recess, wherein a first surface of the circuit board faces the recess;
a light source layer including a plurality of light emitting devices disposed on the first surface of the circuit board;
a wireless power receiving module disposed on one of the first surface or a second surface of the circuit board, which is opposite the first surface; and
a cover processor disposed on one of the first surface or the second surface and electrically connected to the wireless power receiving module and the plurality of light emitting devices of the light source layer,
wherein the light source layer further includes a light emitting device concentrated area formed to correspond to a central position of the recess, and a light emitting device dispersed area, which includes an area of the light source layer other than the light emitting device concentrated area,
wherein the cover processor is configured to control the light source layer to represent a first predetermined pattern in the light emitting device concentrated area in response to receiving a first signal from the electronic device,
wherein the cover processor is configured to control the light source layer to produce a specific atmosphere only in the light emitting device dispersed area in response to receiving a second signal from the electronic device, wherein the second signal is different from the first signal,
wherein the cover processor is configured to control the light source layer to represent a second predetermined pattern in both the light emitting device concentrated area and the light emitting device dispersed area in response to receiving a third signal from the electronic device, and
wherein the light emitting device is driven with power received from the electronic device through the wireless power receiving module so that the cover does not have a battery.

2. The cover accessory of claim 1, wherein the wireless power receiving module includes a near field communication (NFC) module.

3. The cover accessory of claim 1, wherein the cover further includes a surface formed to be uneven and an opposite surface formed to be flat, the surface formed to be uneven being depressed at portions corresponding to the positions of the light emitting devices.

4. The cover accessory of claim 1, wherein the cover further includes a deposition layer formed of a metal oxide deposited on a surface thereof.

5. The cover accessory of claim 1, wherein the circuit board includes a flexible printed circuit board (FPCB), and wherein the light emitting device includes a light emitting diode (LED) device.

6. The cover accessory of claim 1, wherein the cover is formed of a plastic polymer mixed with a shielding dye.

7. The cover accessory of claim 1, further comprising a finishing layer disposed on a surface of the cover and covering the recess.

* * * * *